United States Patent Office 3,147,181
Patented Sept. 1, 1964

3,147,181
NEMATOCIDAL 4-HALO-2-BUTYNYL ETHERS
AND SULFIDES
Thomas R. Hopkins and Joe W. Pullen, Overland Park, Kans., assignors, by mesne assignments, to Gulf Oil Corporation, Pittsburgh, Pa., a corporation of Pennsylvania
No Drawing. Filed Apr. 6, 1962, Ser. No. 185,534
12 Claims. (Cl. 167—22)

This invention relates to novel compositions and methods for controlling nematodes. More specifically, this invention relates to new 4-halo-2-butynyl ethers and the thio analogues, the 4-halo-2-butynyl sulfides, and methods of using them for controlling plant parasitic nematodes.

Nematodes are non-segmented worms, sometimes referred to as eelworms, which are found in all soils in which plants grow, and consequently every major crop is a potential victim of this pest. Some species such as the root-knot nematodes, Meloidogyne spp., citrus nematodes, and sugar best nematode, *Heterodera schachtii*, infest soils in which crops are planted and cause considerable damage to the crop. It has been estimated that the annual damage either directly or indirectly incurred from plant parasitic nematodes is as high as several million dollars. The term "nematode" as used herein is intended to include all forms through which nematodes pass in a life cycle, such as eggs, larvae and adults.

According to the present invention, there are provided new nematocidal compositions containing one or more 4-halo-2-butynyl ethers or 4-halo-2-butynyl sulfides. There are also provided novel methods for controlling nematodes by employing the 4-halo-2-butynyl ethers and 4-halo-2-butynyl sulfides. The 4-halo-2-butynyl compounds of this invention can be represented by the formula

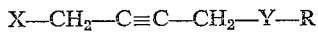

wherein X is a halogen atom, and preferably bromine or chlorine, Y represents oxygen or sulfur, and R represents an alkyl, cycloalkyl, aralkyl or heterocyclic radical. Where R is an alkyl radical, it is preferably a lower alkyl having one to about eight carbon atoms, straight or branched chain. R may aso represent a cycloalkyl group, and especially the lower cyclic alkyl groups having three to about eight carbon atoms; an aralkyl group, and especially the monocyclic aralkyl groups; or a heterocyclic group, and especially the monocyclic radicals having oxygen in addition to carbon in the ring. Examples of radicals represented by R include methyl, ethyl, propyl, isopropyl, n-butyl, isobutyl, pentyl, hexyl, octyl, cyclopentyl, cyclohexyl, benzyl, phenylethyl, furfuryl and tetrahydrofurfuryl.

It has been found that nematodes are effectively controlled by exposing them to a nematocidal amount of the 4-halo-2-butynyl ethers or sulfides of this invention, such as by application of the compounds to soil infested with plant parasitic nematodes. When applied to soil at rates suitable for controlling nematodes, these compounds are not phytotoxic to growing plants. Since the compounds are relatively volatile at normal atmospheric temperatures, they act as fumigants, and are rapadily distributed through the soil, permeating soil above, below and adjacent to the site of application, thereby giving a rapid and widespread exposure of the chemical to the nematodes.

The 4-halo-2-butynyl ethers can be prepared by any one of several procedures. One such suitable procedure is the halogenation of the corresponding 4-hydroxy-2-butynyl ether with a nucleophilic halogenating agent such as thionyl chloride and phosphorus tribromide to give the corresponding 4-halo-2-butynyl ether. The reaction can be illustrated by the equation

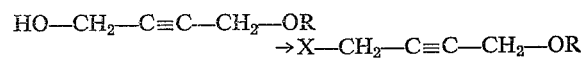

wherein X and R have the significance previously assigned.

The reaction is readily effected by bringing the reactants together, preferably in an inert reaction medium at room temperature or somewhat higher temperatures. At such temperatures the reaction goes to completion in a short time, one to three hours ordinarily being adequate. The solvent used is a matter of choice for those skilled in the art although benzene, diethyl ether, carbon tetrachloride and chloroform may be used satisfactorily with some of the reactants. A catalytic amount of pyridine may be included in the reaction to improve yields and increase the rate of halogenation. Recovery of the product from the reaction mixture can be effected by conventional methods.

The 4-iodo-2-butynyl ethers may be conveniently prepared from the corresponding 4-chloro 2-butynyl ether and sodium iodide by the conventional metathesis procedures.

Alternate processes may be employed to prepare the 4-halo-2-butynyl ethers, some of which are illustrated herein by the examples.

The 4-hydroxy-2-butynyl ethers useful as intermediates in the preparation of the 4-halo-2-butynyl ethers can be prepared by the reaction of 4-chloro-2-butyn-1-ol with an alkali metal salt of the appropriate alcohol.

The 4-halo-2-butynyl sulfides can be prepared by the reaction of a 1,4-dihalo-2-butyne with an alkali metal salt, such as potassium or sodium, of the corresponding mercaptan. The reaction can be illustrated by the equation

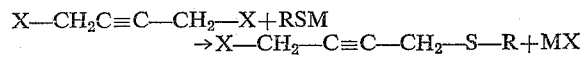

wherein X and R have the significance previously assigned and M is an alkali metal, preferably potassium or sodium.

This reaction is readily effected by bringing the reactants together, preferably in an inert liquid medium, at room temperature or somewhat higher or lower temperatures. At such temperatures the reaction goes to completion in a short time, one to three hours ordinarily being adequate. Again the solvent used is a matter of choice for those skilled in the art although alcohols such as ethanol, have been found to be especially useful. Essentially equimolar amounts of the reactants or a slight excess of the mercaptan salt is advisably used. Recovery of the product from the reaction mixture can be effected by conventional methods and the crude product can be purified by distillation under reduced pressure.

The intermediate alkali metal salts of the mercaptan are readily prepared by reaction of the mercaptan with an alkali metal hydroxide.

Examples of representative 4-halo-2-butynyl ethers and sulfides according to the present invention include 4-chloro-2-butynyl methyl sulfide, 4-chloro-2-butynyl ethyl sulfide, 4-bromo-2-butynyl n-butyl sulfide, 4-chloro-2-butynyl n-pentyl sulfide, 4-bromo-2-butynyl cyclohexyl sulfide, 4-bromo-2-butynyl isopropyl sulfide, 4-chloro-2-butynyl benzyl sulfide, 4-chloro-2-butynyl n-octyl sulfide, 4-chloro-2-butynyl ethyl ether, 4-iodo-2-butynyl methyl ether, 4-bromo-2-butynyl methyl ether, 4-chloro-2-butynyl cyclohexyl ether, 4-bromo-2-butynyl furfuryl ether, 4-chloro-2-butynyl benzyl ether, 4-chloro-2-butynyl n-butyl ether and 4-chloro-2-butynyl tetrahydrofurfuryl ether.

The following examples illustrate the preparation of some representative 4-halo-2-butynyl ethers and sulfides of this invention, but are not to be considered to limit the scope of invention.

EXAMPLE 1

4-Chloro-2-Butynyl Methyl Ether

To a stirred mixture of 31.4 grams (0.3 mole) of 4-chloro-2-butyn-1-ol and 200 ml. of water was added from a dropping funnel an aqueous solution containing 12 grams (0.3 mole) of sodium hydroxide, while simultaneously, 37.8 grams (0.3 mole) of dimethyl sulfate was added from another dropping funnel. The addition was made at a temperature of 0 to 10° C. over a period of 30 minutes. The mixture was then refluxed for 3 hours. The lower, amber colored organic layer was separated and the water layer was extracted with two 50 ml. portions of diethyl ether. The ether extracts were combined with the separated organic layer and dried over calcium sulfate. The ether was removed by distillation under reduced pressure (water aspirator) to give 17.9 grams of a residual oil. The oil was distilled under reduced pressure and the fraction boiling at 60–62° C./15 mm. was collected as 4-chloro-2-butynyl methyl ether (10.7 grams); $N_D^{20}$ 1.4670.

EXAMPLE 2

4-Bromo-2-Butynyl Methyl Ether

To a solution of 10.1 grams of 4-hydroxy-2-butynyl methyl ether, 2 drops of pyridine and 100 ml. of chloroform was added, dropwise with stirring, 13.5 grams of phosphorus tribromide at 0–2° C. After the addition was completed, the mixture was allowed to warm to 10° C. in a one-hour period and then poured onto 100 ml. of cracked ice. The chloroform layer was separated, washed with a sodium bicarbonate solution, and dried over anhydrous sodium sulfate. After removal of the solvent by distillation under reduced pressure there was obtained 7.0 grams of pale amber liquid, $N_D^{20}$ 1.4902.

EXAMPLE 3

4-Iodo-2-Butynyl Methyl Ether

To 300 ml. of ethanol saturated with sodium iodide was added 11.9 grams of 4-chloro-2-butynyl methyl ether. The solution turned a bright yellow color immediately, and after 10 minutes became very turbid. The mixture was stirred at about room temperature for 16 hours and then filtered to remove the crystalline, insoluble salt. Ten grams of sodium iodide were added to the filtrate and the mixture stirred an additional 2 hours. The solution was then concentrated by evaporation under an air stream to about 100 ml. The insoluble salt was removed by filtration and the filtrate diluted with 200 ml. of water. The water layer was decanted from the lower, dark orange oil which was extracted with four 100 ml. portions of diethylether. The combined ether extracts were dried over sodium sulfate and the ether removed by distillation under reduced pressure (water aspirator). The residue was kept under reduced pressure for 2 hours and filtered again. The resultant oil was kept in a vacuum desiccator over calcium chloride for 1.5 hours at reduced pressure (8 mm.) to give the produce as an orange oil; $N_D^{20}$ 1.5740.

EXAMPLE 4

4-Chloro-2-Butynyl Cyclohexyl Ether 4-hydroxy-2-butynyl cyclohexyl ether was prepared by reacting one mole of 4-chloro-2-butyn-1-ol with sodium cyclohexylate in 1200 ml. of diethyl ether. After removing the by-product sodium chloride, the ether solution was washed with 1% aqueous sulfuric acid until it was neutral, and dried over sodium sulfate. The ether solution of 4-hydroxy-2-butynyl cyclohexyl ether was chlorinated with thionyl chloride in the presence of 5 drops of pyridine. The thionyl chloride (1 mole) was added dropwise at about 30–34° C. over a period of about 70 minutes. The mixture was stirred at about room temperature for 1.5 hours and then poured over cracked ice. The aqueous solution was neutralized with sodium bicarbonate, the ether layer separated and dried over sodium sulfate. The ether was removed by distillation under reduced pressure to give 4-chloro-2-butynyl cyclohexyl ether as a dark oil which would not distill at 70° C. under 0.2 mm. pressure; $N_D^{20}$ 1.5261.

EXAMPLE 5

4-Chloro-2-Butynyl Benzyl Ether

Thionyl chloride (59.5 grams) was added dropwise to a stirred solution of 83 grams of 4-hydroxy-2-butynyl benzyl ether, 43.5 grams of pyridine and 200 ml. of diethyl ether at about 5–35° C. The thionyl chloride addition required 2 hours. The mixture was stirred for 2 hours at room temperature and then heated at 34° C. for 1 hour. After standing overnight, the upper layer was decanted from a black tar. The tar was extracted once with diethyl ether and the ether extract combined with the previously separated upper ether layer and dried over anhydrous sodium sulfate. The ether was removed by distillation under reduced pressure to give a dark brown oil as a residue. Volatiles were removed by heating the oil up to 80° C. at 0.3 mm. pressure to give 4-chloro-2-butynyl benzyl ether as a dark oil; $N_D^{20}$ 1.5410.

EXAMPLE 6

4-Chloro-2-Butynyl Furfuryl Ether

To a stirred solution of 123 grams of 1,4-dichloro-2-butyne and 300 ml. of dioxane was added a slurry of 0.25 mole of sodium furfurylate in 350 ml. of dioxane at about 26–29° C. The dioxane-sodium furfurylate slurry was added in 20 ml. portions over a period of 5 hours. After standing for several days, the pH of the mixture dropped from 9 to neutral. The mixture was filtered to remove the insoluble salt and the filtrate distilled under reduced pressure to remove the solvent and give a residual black oil, which was collected as 4-chloro-2-butynyl furfuryl ether.

EXAMPLE 7

4-Chloro-2-Butnyl Ethyl Ether

To 400 ml. of absolute ethanol containing freshly prepared sodium ethoxide (0.9 mole) was added 0.9 mole of 4-chloro-2-butyn-1-ol. The temperature rose slowly to 75° C. during the addition. The resulting solution was refluxed for 4 hours and then cooled to room temperature and filtered. The filtrate was distilled under reduced pressure to remove the ethanol and the residue dissolved in benzene. Pyridine (5 drops) was added to the benzene solution and then 0.9 mole of thionyl chloride added dropwise at 50° C. The resultant solution was maintained at 50° C. for 2 hours, then cooled and poured over cracked ice. The benzene layer was separated, dried over calcium chloride and distilled under reduced pressure. 4-chloro-2-butynyl ethyl ether was collected at 51–52° C./2 mm.; $N_D^{27}$ 1.4530.

EXAMPLE 8

4-Chloro-2-Butynyl n-Butyl Ether 4-butoxy-2-butyn-1-ol was prepared from sodium butoxide and 4-chloro-2-butyn-1-ol and then chlorinated with thionyl chloride in benzene as described in Example 7.

Distillation under reduced pressure gave 4-chloro-2-butyl n-butyl ether as a fraction boiling at 70–72° C./2 mm.; $N_D^{25}$ 1.4610.

EXAMPLE 9

*4-Chloro-2-butynyl Methyl Sulfide*

To a solution of 13.2 grams of 85% potassium hydroxide in 200 ml. of ethanol was added at room temperature 12.0 grams (0.25 mole) of methyl mercaptan. The resulting potassium salt was added dropwise over a 40 minute period to 24.6 grams (0.30 mole) of 1,4-dichloro-2-butyne in 100 ml. of ethanol while maintaining a temperature of 23–25° C. The mixture was then refluxed for 1.5 hours, allowed to cool to room temperature and added to 1.5 liter of water. The resulting mixture was extracted with four 250 ml. portions of diethyl ether, the combined ether extracts dried over calcium sulfate and the ether then removed by distillation. The residue was distilled at reduced pressure and the fraction boiling at 79–88° C./4 mm. was collected at 4-chloro-2-butynyl methyl sulfide; $N_D^{20}$ 1.5340.

EXAMPLE 10

*4-Chloro-2-butynyl Ethyl Sulfide*

To a stirred solution of 13.2 grams of 85% potassium hydroxide in 200 ml. of ethanol was added 15.5 grams (0.25 mile) of ethyl mercaptan at about 23° C. over a 10 minute period. This solution was added dropwise to a stirred solution of 24.6 grams (0.20 mole) of 1,4-dichloro-2-butyne in 100 ml. of ethanol at 23–25° C. over a 40 minute period. The mixture was then refluxed for 2 hours and allowed to stand overnight. The mixture was filtered and the filtrate added to 1 liter of water, the aqueous mixture extracted with diethyl ether and the ether extracts dried over anhydrous sodium sulfate. The ether was removed by distillation and the residue distilled under reduced pressure, collecting the fraction boiling at 94–99° C./7–7.5 mm. as 4-chloro-2-butynyl ethyl sulfide; $N_D^{20}$ 1.5270. The product weighed 12.7 grams, corresponding to a 42.8% conversion.

EXAMPLE 11

*4-Chloro-2-Butynyl n-Butyl Sulfide*

To a stirred solution of 13.2 grams of 85% potassium hydroxide in 20 ml. of ethanol was added dropwise 20.0 grams (0.22 mole) of n-butyl mercaptan at about 25° C. over a 10 minute period. This solution was then added dropwise to a stirred solution of 24.6 grams (0.20 mole) of 1,4-dichloro-2-butyne in 100 ml. of ethanol at about 23–25° C. over a 35 minute period. The mixture was heated at reflux for 1.5 hours and then cooled to room temperature. The cooled mixture was added to 1.5 liter of water, the water solution extracted with four 200 ml. portions of diethyl ether and the combined ether extracts dried over calcium sulfate. The ether was removed by distillation and the residue distilled under reduced pressure under a nitrogen atmosphere. The fraction boiling at 94–96° C./2–3 mm. was collected as 4-chloro-2-butynyl n-butyl sulfide (15.4 grams); $N_D^{20}$ 1.5103.

The optimum rate of application for the control of plant parasitic nematodes will depend on the type of crop as well as such features as pH of the soil, soil conditions, climatic conditions and the particular type of nematode being treated. It has been found, however, that excellent control of the root knot nematode, without danger of phytotoxicity, is exhibited at a dosage of about 10–100 lbs. per acre. Lower rates are effective if the agent is thoroughly mixed with the soil.

The application of the 4-halo-2-butynyl ethers and sulfides to soil is readily achieved by the use of novel concentrates and compositions containing these compounds as the active ingredients. To achieve a suitable dispersion in soil it is convenient to employ compositions in which the active compound is combined with an inert carrier or diluent. The carrier can be a solvent which is miscible with the active agent, or it can be a solvent which is not miscible with the compound where suitable dispersions are also effective. Such compositions can be sprayed on the soil, applied to a trench or injected into the soil.

The active compound can also be absorbed on solid carriers, particularly powders of either organic or mineral composition. Examples of such solid carriers are pumice, expanded mica, kaolin, clay and pulverized limestone. Dusting is a convenient method of applying such compositions.

Water is useful as a carrier because it is widely available and inexpensive. Since the compounds are essentially immiscible with water, however, there should be included in the composition a surface active agent which will provide a homogeneous mixture from which the nematocidal compound will not settle out rapidly. The surface active agent may be ionic or non-ionic, and may be liquid or a solid. The use of the term "surface active agent" herein is intended to include such compounds commonly referred to as wetting agents, dispersing agents and emulsifying agents. Typical surface active agents which may be used are alkali metal higher alkylarylsulfonates such as sodium dodecylbenzenesulfonate, fatty alcohol sulfates such as the sodium salts of the monoesters of sulfuric acid with n-aliphatic alcohols containing 8–18 carbon atoms, sodium salts of alkylnaphthalenesulfonic acids, long chain quaternary ammonium compounds, sodium salts of petroleum-derived alkylsulfonic acids, polyethylene sorbitan monooleate, alkylaryl polyether alcohols, water-soluble lignin sulfonate salts, alkali-casein compositions, long chain alcohols usually containing 10 to 18 carbon atoms and condensation products of ethylene oxide with fatty acids, alkyl phenols and mercaptans. These dispersing and wetting agents are sold under numerous trade names and may either be pure compounds, mixtures of compounds of the same general group, or they may be mixtures of compounds of different classes. Surface active agents can also be used in compositions containing a solid inert carrier.

An adjuvant liquid may also be included in such compositions. Such liquids may be either soluble or insoluble in water, and may be any solvent such as an alcohol, benzene, toluene, kerosene or hexane, which aids in solubilizing or dispersing the active nematocidal agent in water.

Concentrated compositions containing the active nematocidal agent which may be subsequently diluted, as with water, to the desired concentration for application to soils are also provided. The advantages of such concentrates are that they are prepared by the manufacturer in a form such that the user need only mix them with a locally available carrier, preferably water, thereby keeping shipping costs to a minimum while providing a product which may be used with a minimum of equipment and effort. Such concentrates may contain about 50% or more of the active nematocidal agent with a carrier or diluent, which may be a solid or liquid. Liquid carriers which are miscible with the active agent or other liquids in which the compound may be suspended may be used. A wetting or surface active agent is also generally included to facilitate such dilution or dispersion in water. However, the wetting agent or surface active agent itself may comprise the carrier in such concentrates.

As hereinbefore stated, the nematocidal compositions of this invention may be applied to soil by injection below the surface of soil, thereby acting as soil fumigants, moving to adjacent areas and killing harmful plant parasitic nematodes. When employed as a fumigant, the 4-halo-2-butynyl ethers and sulfides may be applied as the undiluted compound or may be diluted with a liquid carrier. Kerosene is a preferred carrier for application by soil injection. The nematocidal 4-halo-2-butynyl compounds are readily miscible with kerosene, providing an excellent fumigant composition.

The nematocidal compositions may also be used as a root dip, whereby the roots of nematode-infested plants are dipped briefly in compositions comprising the 4-halo-2-butynyl ether or sulfide and a liquid carrier or diluent.

The following examples illustrate the nematocidal activity of representative compositions of this invention.

EXAMPLE 12

Water suspensions of the test chemicals were prepared in concentration series of 500, 50 and 5 parts per million. Each concentration was placed in a stoppered test tube. Young adult Panagrellus nematodes were added to each test tube and the contents observed after 24 hours and again after 7 days. The number of live nematodes was observed and the lowest concentration of chemical giving 99+% kill was recorded. The results are recorded in Table I.

*Table I*

| Compound | Lowest Effective Concentration (p.p.m.) | |
|---|---|---|
| | At 24 Hrs. | At 7 Days |
| 4-chloro-2-butynyl methyl sulfide | 500 | 50 |
| 4-chloro-2-butynyl ethyl sulfide | 50 | 50 |
| 4-chloro-2-butynyl n-butyl sulfide | 500 | 50 |
| 4-chloro-2-butynyl methyl ether | 500 | 50 |
| 4-bromo-2-butynyl methyl ether | 50 | 5 |
| 4-iodo-2-butynyl methyl ether | 50 | 5 |
| 4-chloro-2-butynyl ethyl ether | 500 | 50 |
| 4-chloro-2-butynyl n-butyl ether | 500 | 50 |
| 4-chloro-2-butynyl benzyl ether | 50 | 50 |
| 4-chloro-2-butynyl cyclohexyl ether | N.S. | 500 |
| 4-chloro-2-butynyl furfuryl ether | 50 | 50 |
| Control (no chemical) | N.S. | N.S. |

N.S.=No significant control.

EXAMPLE 13

The following experiment was made to determine the effectiveness of the compounds as dust compositions for controlling nematodes in the presence of soil. The chemicals were mixed with kaolin, slurried with acetone, and the acetone then evaporated to leave a chemical dust. The dust was mixed with root-knot nematode infested soil at application rates of 100, 31 and 10 pounds per acre, and held in sealed jars (three replicates) for seven days at 86° F. The soil was then potted and planted to squash seven days later. The plant roots were examined for galling two months after planting. The percent control was determined by the amount of galling, i.e., no galls-100% control. The results are presented in Table II.

*Table II*

| Compound | Percent Control a at Application Rates of— | | |
|---|---|---|---|
| | 100 lb./A. | 31 lb./A. | 10 lb./A. |
| 4-chloro-2-butynyl methyl sulfide | 100 | 0 | 0 |
| 4-chloro-2-butynyl ethyl sulfide | 100 | 100 | 97 |
| 4-chloro-2-butynyl n-butyl sulfide | 100 | 100 | 80 |
| 4-chloro-2-butynyl methyl ether | 100 | 100 | 80 | a Average of three replicates.

EXAMPLE 14

The following experiment was conducted to evaluate the 4-halo-2-butynyl ethers and sulfides as soil fumigants for nematodes.

One-gallon glazed crocks were half-filled with root-knot nematode (Meloidogyne spp.) infested soil. A kerosene solution (2.5 ml.) of each chemical was then pipetted onto the soil surface at the center of the crock. Concentration of the test chemical in kerosene was varied to give application rates of 100, 31, 10 and 3.1 pounds per acre (by volume). Two replicates were used with each concentration. The crocks were then immediately filled with nematode infested soil. After filling, the soil was pressed gently with a flat surface to provide a vapor seal. The crocks were held at a constant temperature (80±1° F.) for three weeks and then transferred to a greenhouse and planted to tomato seedlings.

Eight weeks after planting, the roots were examined for nematode control. Nematode control was determined from the amount of galling. The results are recorded in Table III.

*Table III*

| Compound | Percent Control a of Nematodes at Rates of— | | | |
|---|---|---|---|---|
| | 100 lb./A. | 31 lb./A. | 10 lb./A. | 3.1 lb./A. |
| 4-chloro-2-butynyl n-butyl sulfide | 99 | 97 | 50 | N.S. |
| 4-chloro-2-butynyl ethyl sulfide | 100 | 99 | 93 | 70 |
| 4-chloro-2-butynyl methyl ether | 100 | 100 | 99 | |
| 4-chloro-2-butynyl n-butyl ether | 99 | 75 | N.S. | |
| 4-chloro-2-butynyl ethyl ether | 100 | 100 | 97 | |
| Kerosene Control | N.S. | N.S. | N.S. | N.S. |

N.S.—No significant control.
a Mean of two replicates.

This application is a continuation-in-part of our co-pending applications Serial Number 15,535, filed March 17, 1960, and Serial Number 22,106, filed April 14, 1960, now U.S. Patent 3,086,059.

Various changes and modifications of the invention can be made and, to the extent that such variations incorporate the spirit of this invention, they are intended to be included within the scope of the appended claims.

We claim:

1. The method of controlling plant parasitic nematodes which comprises applying to soil a nematocidal amount of 4-halo-2-butynyl lower alkyl sulfide.

2. The method of controlling plant parasitic nematodes which comprises applying to soil a nematocidal amount of 4-chloro-2-butynyl methyl sulfide.

3. The method of controlling plant parasitic nematodes which comprises applying to soil a nematocidal amount of 4-chloro-2-butynyl ethyl sulfide.

4. The method of controlling plant parasitic nematodes which comprises applying to soil a nematocidal amount of 4-chloro-2-butynyl n-butyl sulfide.

5. The method of claim 1 in which said 4-halo-2-butynyl sulfide is applied at a rate of about 10 to 100 pounds per acre.

6. The method of controlling plant parasitic nematodes which comprises applying to soil a nematocidal amount of 4-halo-2-butynyl lower alkyl ether.

7. The method of controlling plant parasitic nematodes which comprises applying to soil a nematocidal amount of 4-chloro-2-butynyl methyl ether.

8. The method of controlling plant parasitic nematodes which comprises applying to soil a nematocidal amount of 4-chloro-2-butynyl benzyl ether.

9. The method of controlling plant parasitic nematodes which comprises applying to soil a nematocidal amount of 4-chloro-2-butynyl cyclohexyl ether.

10. The method of controlling plant parasitic nematodes which comprises applying to soil a nematocidal amount of 4-chloro-2-butynyl furfuryl ether.

11. The method of claim 6 in which said 4-halo-2-butynyl ether is applied at a rate of about 10 to 100 pounds per acre.

12. The method of controlling nematodes which comprises exposing the nematodes to a nematocidal amount of a compound having the formula $$X-CH_2-C\equiv C-CH_2-Y-R$$

Wherein X is halogen, Y is selected from the class consisting of oxygen and sulfur, and R is selected from the class consisting of lower alkyl, cyclic lower alkyl, phenyl lower alkyl, furfuryl and tetrahydrofurfuryl.

References Cited in the file of this patent

UNITED STATES PATENTS 2,889,244     Youngson _____ June 2, 1959

OTHER REFERENCES

Henne et al.: J. Amer. Chem. Soc., vol. 58 (1936), p. 882.
Simons: Fluorine Chemistry (1950), at page 402.
Fieser: Organic Chemistry (1956), pp. 46–47.